(12) United States Patent
Mahabadipour et al.

(10) Patent No.: US 11,965,450 B2
(45) Date of Patent: Apr. 23, 2024

(54) EXHAUST TREATMENT SYSTEMS FOR WORK VEHICLES

(71) Applicant: CNH Industrial America LLC, New Holland, PA (US)

(72) Inventors: Hamidreza Mahabadipour, Chicago, IL (US); Pratin Naik, Woodridge, IL (US); Haibo Guo, Naperville, IL (US); Samrendra K Singh, Bolingbrook, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/733,442

(22) Filed: Apr. 29, 2022

(65) Prior Publication Data
US 2023/0349311 A1    Nov. 2, 2023

(51) Int. Cl.
*F01N 3/28* (2006.01)
*F01N 3/20* (2006.01)

(52) U.S. Cl.
CPC ......... *F01N 3/2892* (2013.01); *F01N 3/2066* (2013.01); *F01N 2240/20* (2013.01);
(Continued)

(58) Field of Classification Search
CPC .. F01N 3/2892; F01N 3/2066; F01N 2240/20; F01N 2260/06; F01N 2570/14;
(Continued)

(56) References Cited

U.S. PATENT DOCUMENTS 8,420,036 B1 * 4/2013 Miwa .................... F01N 3/2066
  60/287
8,562,924 B1 * 10/2013 Roberts, Jr. ........ B01D 53/9409
  60/299

(Continued)

FOREIGN PATENT DOCUMENTS

FR    2891305 A1    3/2007
FR    2966513 A1    4/2012

(Continued)

OTHER PUBLICATIONS

Lauer, "Preparation of Ammonia from Liquid AdBlue—Modeling Approaches and Future Challenges," Chemie Ingenieur Technik, vol. 90, Issue 6, dated Apr. 27, 2018, (30 pages) https://onlinelibrary.wiley.com/doi/full/10.1002/cite.201700107.

*Primary Examiner* — Kenneth J Hansen
*Assistant Examiner* — Kelsey L Stanek
(74) *Attorney, Agent, or Firm* — Rickard K. DeMille; Rebecca L. Henkel; Peter K. Zacharias (57) ABSTRACT

An exhaust treatment system for a work vehicle includes a mixing conduit extending between upstream and downstream ends along a bulk flow direction, where the upstream end receives engine exhaust. The system further includes an injector nozzle configured to inject exhaust reductant into the mixing conduit at a location between the upstream and downstream ends. Additionally, the system includes a branch conduit, where an inlet end of the branch conduit is fluidly coupled to the mixing conduit upstream of a location at which an outlet end of the branch conduit is fluidly coupled to the mixing conduit. A portion of the exhaust flowing through the mixing conduit may be directed through the branch conduit, where the outlet end of the branch conduit is configured to direct the portion of the exhaust
(Continued)

back into the mixing conduit such that a spiraling flow of the exhaust is generated within the mixing conduit.

20 Claims, 4 Drawing Sheets

(52) U.S. Cl.
CPC ...... *F01N 2260/06* (2013.01); *F01N 2570/14* (2013.01); *F01N 2590/08* (2013.01); *F01N 2610/02* (2013.01); *F01N 2610/1453* (2013.01)

(58) Field of Classification Search
CPC ............. F01N 2590/08; F01N 2610/02; F01N 2610/1453
USPC .......................................................... 60/546
See application file for complete search history.

(56) References Cited

U.S. PATENT DOCUMENTS

| | | |
|---|---|---|
| 8,621,846 B2 | 1/2014 | Thomas |
| 9,249,708 B2 | 2/2016 | Mortensen et al. |
| 9,267,413 B2 | 2/2016 | Morey et al. |
| 9,821,282 B2 | 11/2017 | Li et al. |
| 9,957,868 B2 | 5/2018 | Johnson |
| 2009/0049829 A1 | 2/2009 | Kaiser et al. |
| 2016/0076425 A1 | 3/2016 | Goffe |
| 2020/0040789 A1* | 2/2020 | Kobayashi ............ F01N 3/2053 |
| 2021/0047957 A1* | 2/2021 | Norris .................. F01N 3/2066 |

FOREIGN PATENT DOCUMENTS

| | | |
|---|---|---|
| JP | 3204682 U | 6/2016 |
| WO | WO 2011110885 | 9/2011 |

\* cited by examiner

EXHAUST TREATMENT SYSTEMS FOR WORK VEHICLES

FIELD OF THE INVENTION

The present disclosure relates generally to the treatment of engine exhaust gases, and more particularly, to exhaust treatment systems of work vehicles for improving mixing of exhaust gases.

BACKGROUND OF THE INVENTION

Typically, work vehicles, such as tractors and other agricultural vehicles, include an exhaust treatment system for controlling engine emissions. As is generally understood, exhaust treatment systems for work vehicles often include a diesel oxidation catalyst (DOC) system in fluid communication with a selective catalytic reduction (SCR) system. The DOC system is generally configured to oxidize carbon monoxide and unburnt hydrocarbons contained within the engine exhaust. For instance, the DOC system uses excess oxygen and, optionally, ceramics, metals (e.g., platinum, palladium, etc.), or other suitable catalysts to catalyze the conversion of carbon monoxide and hydrocarbons to water and carbon dioxide. Thereafter, the DOC system may direct the catalyzed exhaust gas having reduced concentrations of carbon monoxide and hydrocarbons to a mixing conduit where a diesel exhaust fluid (DEF), or any other suitable urea-based fluid, is injected into the catalyzed engine exhaust. For instance, the exhaust reductant is often pumped from a reductant tank mounted on and/or within the vehicle and injected into the mixing conduit to mix the reductant with the catalyzed engine exhaust. The resulting mixture may then be supplied to the SCR system to allow the reductant to be reacted with a catalyst in order to reduce the amount of nitrogen oxide (NOx) emissions contained within the engine exhaust. A NOx sensor is typically positioned downstream of the SCR system to monitor the amount of NOx emissions still remaining in the exhaust flow exiting the exhaust treatment system. The data from the sensor may, for example, be used to control the combustion temperature of the engine and/or the amount of reductant injected into the mixing conduit to ensure that the amount of NOx emissions remains below a given amount.

If the mixing conduit does not mix the catalyzed exhaust gas and the DEF properly, the amount of NOx emissions still remaining in the gas detected by the sensor may not be accurate, which may reduce the overall efficiency of the exhaust treatment system. Additionally, if the flow through the mixing conduit is not suitable, droplets of the DEF may deposit on the walls of the mixing conduit, which may increase back pressure on the system and reduce the overall efficiency of the exhaust treatment system.

Accordingly, an improved exhaust treatment system for work vehicles would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to an exhaust treatment system for a work vehicle. The exhaust system may include a mixing conduit extending between an upstream end and a downstream end along a bulk flow direction, with the upstream end of the mixing conduit being configured to receive engine exhaust. The exhaust system may further include an injector nozzle configured to inject exhaust reductant into the mixing conduit at a location between the upstream and downstream ends of the mixing conduit. Additionally, the exhaust system may include a branch conduit extending between an inlet end and an outlet end, where the inlet end of the branch conduit is fluidly coupled to the mixing conduit upstream relative to the bulk flow direction of a location at which the outlet end of the branch conduit is fluidly coupled to the mixing conduit. A portion of the engine exhaust flowing through the mixing conduit may be directed through the branch conduit, where the outlet end of the branch conduit is configured to direct the portion of the engine exhaust back into the mixing conduit such that a spiraling flow of the engine exhaust is generated within the mixing conduit.

In another aspect, the present subject matter is directed to a work vehicle having an engine and an exhaust treatment system configured to receive engine exhaust from the engine. The exhaust system may include a mixing conduit extending between an upstream end and a downstream end along a bulk flow direction, with the upstream end of the mixing conduit being configured to receive engine exhaust. The exhaust system may further include an injector nozzle configured to inject exhaust reductant into the mixing conduit at a location between the upstream and downstream ends of the mixing conduit. Additionally, the exhaust system may include a branch conduit extending between an inlet end and an outlet end, where the inlet end of the branch conduit is fluidly coupled to the mixing conduit upstream relative to the bulk flow direction of a location at which the outlet end of the branch conduit is fluidly coupled to the mixing conduit. A portion of the engine exhaust flowing through the mixing conduit may be directed through the branch conduit, where the outlet end of the branch conduit is configured to direct the portion of the engine exhaust back into the mixing conduit such that a spiraling flow of the engine exhaust is generated within the mixing conduit.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an exhaust treatment system for a work vehicle. In several embodiments, the exhaust treatment system includes an improved mixing conduit that increases the mixing of catalyzed exhaust gases with diesel exhaust fluid (DEF). Particularly, the mixing conduit has a main mixing conduit that defines a bulk flow direction for the catalyzed exhaust gas from an upstream end to a downstream end of the main mixing conduit, where the downstream end of the main mixing conduit is coupled to a selective catalytic reduction (SCR) system. The mixing conduit further includes a branch conduit that takes a portion of the catalyzed exhaust gas flowing through the main mixing conduit from a first location along the main mixing conduit and returns the separated portion of the catalyzed exhaust gas to the main mixing conduit, downstream of the first location along the bulk flow direction. Particularly, the outlet end of the branch conduit is oriented relative to the main mixing conduit such that the separated portion of catalyzed exhaust gas re-entering the main mixing conduit induces a swirling or spiraling flow of the exhaust gases in the main mixing conduit downstream of the second location. Such spiraling flow of the exhaust gases increases the turbulence of the exhaust gases which helps to improve mixing of the DEF and exhaust gases and additionally prevents the DEF from landing on the walls of the main mixing conduit, both of which improve the efficiency of the exhaust treatment system.

Figure 1:
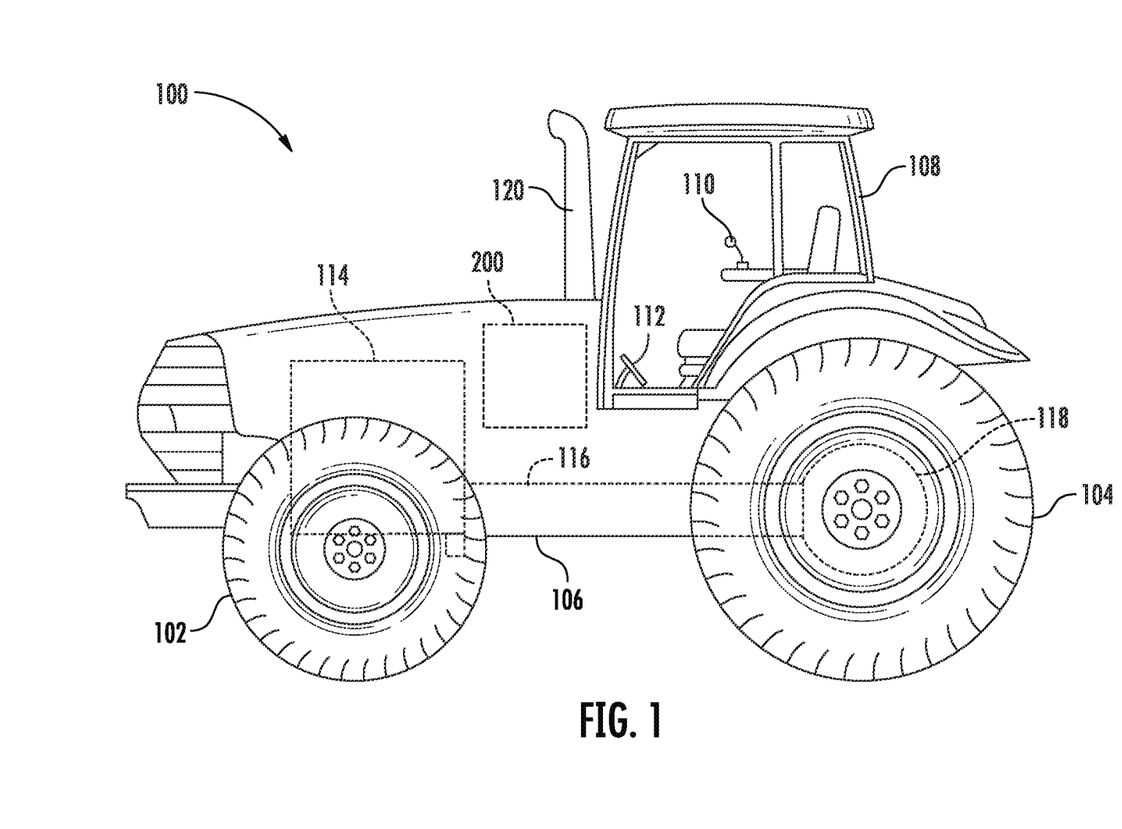
FIG. 1 illustrates a side view of one embodiment of a work vehicle in accordance with aspects of the present subject matter.

Referring now to the drawings, FIG. 1 illustrates a side view of one embodiment of a work vehicle 100. As shown, the work vehicle 100 is configured as an agricultural tractor. However, in other embodiments, the work vehicle 100 may be configured as any other suitable work vehicle known in the art, such as various other agricultural vehicles, earthmoving vehicles, road vehicles, all-terrain vehicles, off-road vehicles, loaders, and/or the like.

As shown in FIG. 1, the work vehicle 100 includes a pair of front wheels 102, a pair of rear wheels 104, and a chassis 106 coupled to and supported by the wheels 102, 104. An operator's cab 108 may be supported by a portion of the chassis 106 and may house various control devices 110, 112 (e.g., levers, pedals, control panels and/or the like) for permitting an operator to control the operation of the work vehicle 100. Additionally, the work vehicle 100 may include an engine 114 and a transmission 116 mounted on the chassis 106. The transmission 116 may be operably coupled to the engine 114 and may provide variably adjusted gear ratios for transferring engine power to the wheels 104 via a differential 118.

Moreover, the work vehicle 100 may also include an exhaust treatment system 200 for reducing the amount of emissions contained within the exhaust from the engine 114. For instance, engine exhaust expelled from the engine 114 may be directed through the exhaust treatment system 200 to allow the levels of nitrogen oxide (NOx) emissions contained within the exhaust to be reduced significantly. The cleaned or treated exhaust gases may then be expelled from the exhaust treatment system 200 into the surrounding environment via an exhaust pipe 120 of the work vehicle 100.

It should be appreciated that the configuration of the work vehicle 100 described above and shown in FIG. 1 is provided only to place the present subject matter in an exemplary field of use. Thus, it should be appreciated that the present subject matter may be readily adaptable to any manner of work vehicle configuration 100. For example, in an alternative embodiment, a separate frame or chassis may be provided to which the engine 114, transmission 116, and differential 118 are coupled, a configuration common in smaller tractors. Still other configurations may use an articulated chassis to steer the work vehicle 100, or rely on tracks in lieu of the wheels 102, 104. Additionally, although not shown, the work vehicle 100 may also be configured to be operably coupled to any suitable type of work implement, such as a trailer, spray boom, manure tank, feed grinder, plow and/or the like.

Figure 2:
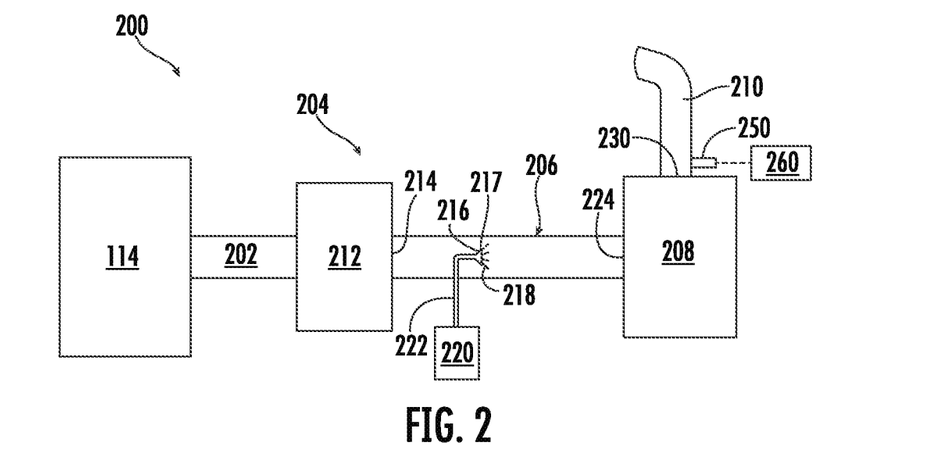
FIG. 2 illustrates a schematic view of one embodiment of an exhaust treatment system suitable for use with a work vehicle in accordance with aspects of the present subject matter.

Referring now to FIG. 2, a schematic diagram of one embodiment of an exhaust treatment system 200 suitable for use with a work vehicle 100 is illustrated in accordance with aspects of the present subject matter. As represented in FIG. 2, the exhaust treatment system includes an exhaust conduit 202, a diesel oxidation catalyst (DOC) system 204, a mixing conduit 206, a selective catalytic reduction (SCR) system 208, and a treated exhaust flow conduit 210. During operation of the work vehicle 100, exhaust expelled from the engine 114 is received by the exhaust conduit 202 and flows through the conduit 202 to the DOC system 204. As is generally understood, the DOC system 204 is configured to reduce the levels of carbon monoxide and hydrocarbons present in the engine exhaust. For example, as shown in FIG. 2, the DOC system 204 includes a canister or chamber 212 for receiving engine exhaust from the exhaust conduit 202, with the chamber 212 being in flow communication with an upstream end 214 of the mixing conduit 206. In some embodiments, the chamber 212 is configured to use excess oxygen in the engine exhaust and, optionally, ceramics, metals (e.g., platinum, palladium, etc.), or other suitable catalysts to catalyze the conversion of carbon monoxide and hydrocarbons in the exhaust into water and carbon dioxide. Generally, the amount of carbon monoxide and hydrocarbons in the catalyzed exhaust flow after passing through the chamber 212 is reduced as compared to the engine exhaust initially discharged from the engine 114.

A reductant injector nozzle 216 is provided to allow an exhaust reductant 218, such as a diesel exhaust fluid (DEF) or any other suitable urea-based fluid, to be injected into the stream of exhaust gases flowing through or from the chamber 212. For instance, as shown in FIG. 2, the reductant injector nozzle 216 may be fluidly coupled to a source of exhaust reductant (e.g., storage tank 220) via a hose or other fluid coupling 222 to allow liquid exhaust reductant 218 to be supplied to the nozzle 216. In one embodiment, the nozzle 216 may be positioned within the mixing conduit 206, such as shown in FIG. 2. The exhaust and the exhaust reductant 218 mix as they flow through the mixing conduit 206.

The exhaust/reductant mixture is then directed through the downstream end 224 of the mixing conduit 206 for receipt by the SCR system 208. Within the SCR system 208, the mixture of exhaust/reductant is reacted with a catalyst to generate a treated exhaust flow in which the amount of harmful or undesirable gas emissions has been reduced as compared to the engine exhaust initially discharged from the engine 114. The treated exhaust flow is then expelled from an outlet 230 of the SCR system 208 and is directed through the downstream flow conduit 210 for discharge into the atmosphere (e.g., via an exhaust pipe 120 forming part of or coupled to the downstream flow conduit 210). It should be appreciated that, in some embodiments, the exhaust treatment system 200 may further include a diesel particulate filter (DPF) (not shown) between the DOC system 204 and the SCR system 208, such as downstream of where the exhaust reductant 218 is injected into the mixing conduit 206 and upstream of the SCR system 208. In such embodiments, the exhaust/reductant mixture is directed through the downstream end 224 of the mixing conduit 206 to the DPF, which collects excess particulate or soot that is not oxidized by the DOC, then the filtered exhaust/reductant mixture is directed to the SCR system 208. The DPF will oxidize the collected particulates when the exhaust temperatures are sufficiently high.

Additionally, the exhaust treatment system 200 may include one or more exhaust sensors 250 configured to monitor the concentration or amount of emissions remaining within the treated exhaust flow following treatment. In one embodiment, the exhaust sensor 250 comprises one or more nitrogen oxide (NOx) sensors configured to detect the amount of NOx contained within the treated exhaust flow. However, in other embodiments, the exhaust sensor 250 may comprise any other suitable sensor(s) or combination of sensor(s) configured to detect the concentration or amount of gaseous emissions contained within the treated exhaust flow, including the detection of gaseous emissions other than NOx and/or the detection of NOx in combination with one or more other gaseous emissions. As shown, in FIG. 2, in one embodiment, the exhaust sensor 250 is communicatively coupled to a controller 260 (e.g., a computing device or another suitable processor-based device) configured to monitor the exhaust emissions contained within the treated exhaust flow based on the data received from the sensor 250. The controller 260 may then, for example, compare the concentration or amount of detected exhaust emissions to a predetermined limit or threshold and control one or more components of the work vehicle 100 based on such comparison, such as by adjusting the combustion temperature of the engine 114 and/or varying the amount of reductant 218 injected into the DOC system 204 to ensure that the exhaust emissions remain below the predetermined limit or threshold.

In general, the better the exhaust F1 and the exhaust reductant 218 mix within the mixing conduit 206 before reaching the SCR system 208, the better the sensor(s) 250 are able to detect the amount of undesirable gaseous emissions within the exhaust flow, and the better the SCR system 208 is able to reduce the amount of harmful or undesirable gas emissions within the exhaust flow. As such, as will be described in greater detail below, increasing the turbulence within the mixing conduit 206 will generally improve the mixing within the mixing conduit 206.

Figure 3A:
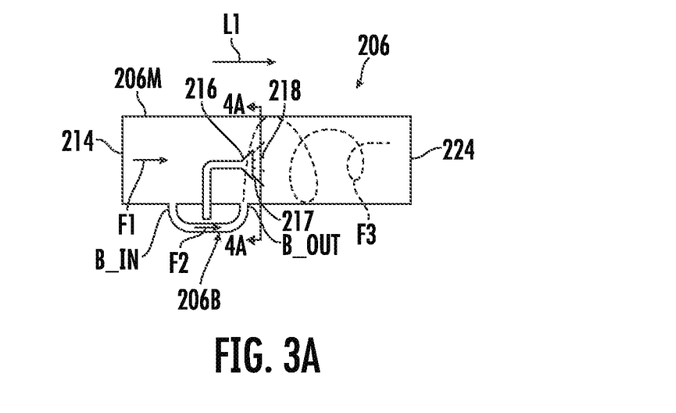
FIGS. 3A-3E illustrate schematic views of different embodiments of mixing conduits suitable for use with the exhaust treatment system shown in FIG. 2 in accordance with aspects of the present subject matter.
Figure 3B:
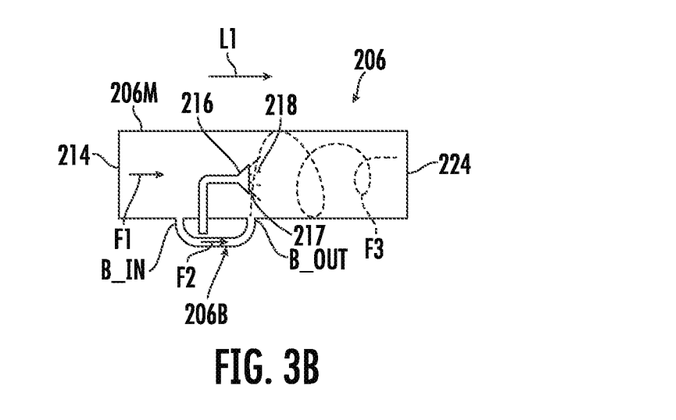
Figure 3C:
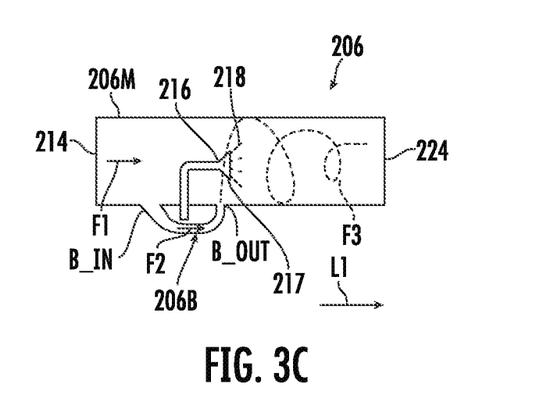
Figure 3D:
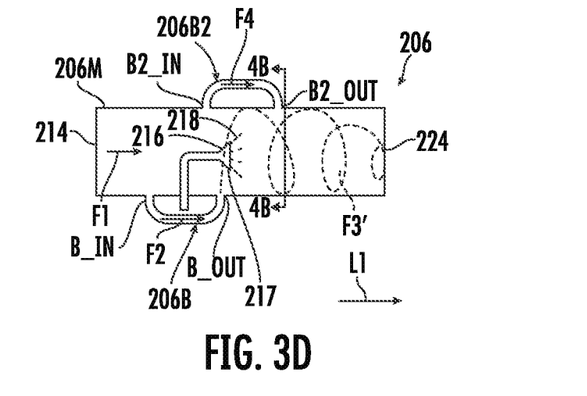
Figure 3E:
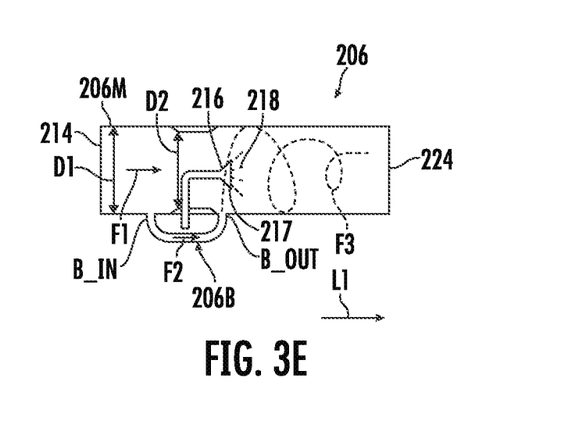
Figure 4A:
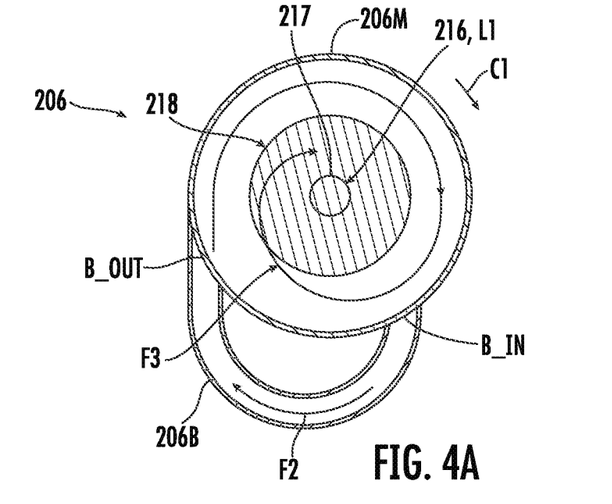
FIG. 4A illustrates a simplified, cross-sectional view of a mixing conduit of an exhaust treatment system taken with respect to line 4A-4A in FIG. 3A in accordance with aspects of the present subject matter.
Figure 4B:
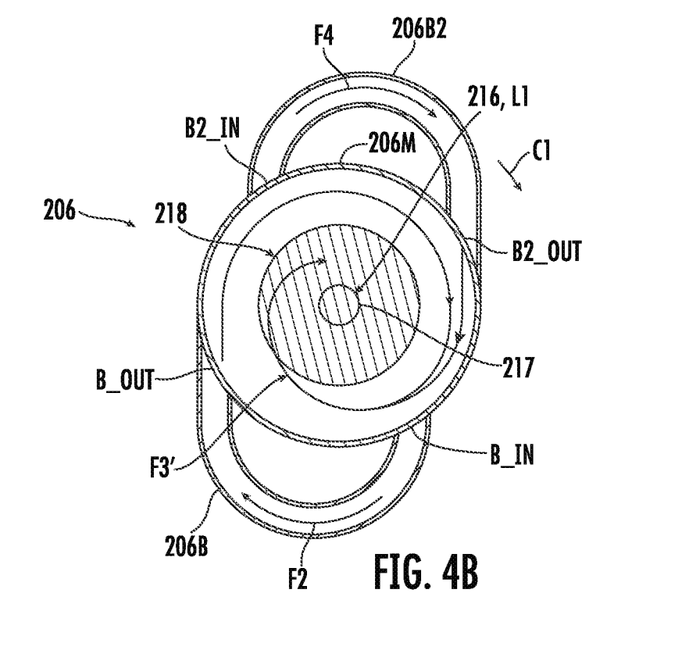
FIG. 4B illustrates a simplified, cross-sectional view of a mixing conduit of an exhaust treatment system taken with respect to line 4B-4B in FIG. 3D in accordance with aspects of the present subject matter.

Referring now to FIGS. 3A-3E and FIGS. 4A-4B, various views of mixing conduits suitable for use with the exhaust treatment system 200 shown in FIG. 2 are illustrated in accordance with aspects of the present subject matter. For instance, FIGS. 3A-3E illustrate schematic views of different embodiments of mixing conduits 206 suitable for use with the exhaust treatment system 200 shown in FIG. 2 in accordance with aspects of the present subject matter. Additionally, FIG. 4A illustrates a simplified, cross-sectional view of the mixing conduit 206 of the exhaust treatment system 200 taken with respect to line 4-4 in FIG. 3A and FIG. 4B illustrates a simplified, cross-sectional view of a mixing conduit of an exhaust treatment system taken with respect to line 4B-4B in FIG. 3D.

As particularly shown in FIGS. 3A-3E, the mixing conduit 206 includes a main portion 206M extending from the upstream end 214 to the downstream end 224 of the mixing conduit 206 along a bulk flow direction L1. The main portion 206M of the mixing conduit 206 has a central axis parallel to the bulk flow direction L1, such that the catalyzed exhaust (indicated with arrow F1) entering the main portion 206M of the mixing conduit 206 moves generally parallel to the bulk flow direction L1. The injector nozzle 216 is positioned within the main portion 206M of the mixing conduit 206. For instance, the injector nozzle 216 is positioned within the main portion 206M of the mixing conduit 206 at a location between the upstream and downstream ends 214, 224 of the mixing conduit 206. The injector nozzle 216 is generally oriented parallel to the bulk flow direction L1, such that the exhaust reductant 218 is directed through an outlet opening 217 of the injector nozzle 216 toward the downstream end 224 of the mixing conduit. In one embodiment, the injector nozzle 216 may create a conical spray pattern for the exhaust reductant 218, having a central spray axis directed generally along the bulk flow direction L1, as shown in FIGS. 4A and 4B. However, in other embodiments, the injector nozzle 216 may create any other suitable spray pattern for the exhaust reductant 218. The catalyzed exhaust F1 received from the chamber 212 helps to further direct the exhaust reductant 218 toward the downstream end 224 of the mixing conduit.

In accordance with aspects of the present subject matter, the mixing conduit 206 further includes a branch conduit 206B for increasing the mixing of the catalyzed exhaust F1 and the exhaust reductant 218. In general, the branch conduit 206B removes a portion of the catalyzed exhaust (shown with arrow F2) from the main portion 206M of the mixing conduit 206 and returns the portion of the catalyzed exhaust F2 back to the main portion 206M of the mixing conduit 206 in a way that increases the mixing of the catalyzed exhaust and the exhaust reductant 218 (the mixture of the catalyzed exhaust F1, F2 and the exhaust reductant 218 being indicated with dashed line F3). More particularly, the branch conduit 206B extends between an inlet end B_in and an outlet end B_out, where the inlet end B_in of the branch conduit 206B is located at a position upstream of the outlet end B_out of the branch conduit 206B relative to the bulk flow direction L1. For instance, the inlet end B_in is fluidly coupled to the main portion 206M at a first location along the main portion 206M of the mixing conduit 206 in the bulk flow direction L1 and the outlet end B_out is fluidly coupled to the main portion 206M at a second location along the main portion 206M of the mixing conduit 206 in the bulk flow direction L1, where the first location is upstream of the second location along the bulk flow direction L1.

The outlet end B_out of the branch conduit 206B is configured to direct the portion of the catalyzed exhaust F2 to re-enter the main portion 206M of the mixing conduit 206 in a way that induces a spiraling flow within the main portion 206M of the mixing conduit 206 downstream of the outlet end B_out of the branch conduit 206B. In several embodiments, the outlet end B-out of the branch conduit 206B is oriented relative to the main portion 206M of the mixing conduit 206 such that the swirling or spiraling flow is induced within the mixing conduit 206. For instance, as particularly shown in FIGS. 4A and 4B, at least a portion of the outlet end B_out of the branch conduit 206 may be oriented tangent or substantially tangent to the outer circumference of the main portion 206M of the mixing conduit 206 in a plane perpendicular to the bulk flow direction L1 such that the catalyzed exhaust F2 exiting the outlet end B_out flows along the inner circumference of the main portion 206M of the mixing conduit 206 in the circumferential direction C1. The catalyzed exhaust F1 helps to direct the spiraling flow F3 towards the downstream end 224 of the main portion 206M.

Additionally, in some embodiments, such as shown in FIGS. 4A and 4B, the inlet end B_in of the branch conduit 206B may be at a different position about the outer circumference of the mixing conduit 206 than the outlet end B_out of the branch conduit 206B in a circumferential direction C1. As such, the branch conduit 206B may at least partially wrap in the circumferential direction C1 about the main portion 206M of the mixing conduit 206 from the inlet end B_in to the outlet end B_out. Such wrapping may induce the spiraling flow of the portion of the catalyzed exhaust F2 exiting the branch conduit 206B without the outlet end B_out of the branch conduit 206B being oriented tangent or substantially tangent to the main portion 206M of the mixing conduit 206, or may help to further induce the spiraling when the outlet end B_out of the branch conduit 206B is oriented tangent or substantially tangent to the main portion 206M of the mixing conduit 206. However, it should be appreciated that, in some embodiments, the inlet and outlet ends B_in, B_out of the branch conduit 206B are at the same position about the outer circumference of the main portion 206M of the mixing conduit 206 in the circumferential direction C1, such that the inlet and outlet ends B_in, B_out of the branch conduit 206B are aligned along the bulk flow direction L1, with at least the outlet end B_out of the branch conduit 206B being oriented tangent or substantially tangent to the main portion 206M of the mixing conduit 206.

As shown in FIGS. 3A-3E, the inlet end B_in of the branch conduit 206B is located upstream of the nozzle 216 relative to the bulk flow direction. In one embodiment, such as the embodiment shown in FIG. 3A, the outlet end B_out of the branch conduit 206B is also positioned upstream of the outlet opening 217 of the nozzle 216, such that the spiraling flow of the exhaust gases F1, F2 may be established upstream of where the exhaust reductant 218 is introduced into the main portion 206M of the mixing conduit 206. However, in another embodiment, such as the embodiment shown in FIG. 3B, the outlet end B_out of the branch conduit 206B is instead positioned at or downstream of the outlet opening 217 of the nozzle 216.

In some embodiments, such as shown in FIG. 3C, a diameter of the branch portion 206B may taper from the inlet end B_in to the outlet end B_out. For instance, a diameter of the branch portion 206B at the inlet end B_in may be greater than a diameter of the branch portion 206B at the outlet end B_out. By tapering the diameter of the branch portion 206B from the inlet end B_in to the outlet end B_out a velocity of the portion of the catalyzed exhaust F2 flowing through the branch portion 206B may increase from the inlet end B_in to the outlet end B_out, which may increase the spiraling effect of the catalyzed exhaust F2 flowing back into the main portion 206M of the mixing conduit 206.

In one embodiment, such as shown in FIG. 3D, the mixing conduit 206 may have an additional branch conduit 206B2. The additional branch conduit 206B2 may generally be configured the same as the branch conduit 206B. For instance, the additional branch conduit 206B2 may remove a further portion of the catalyzed exhaust (shown with arrow F4) from the main portion 206M of the mixing conduit 206 and return the portion of the catalyzed exhaust F4 back to the main portion 206M of the mixing conduit 206 in a way that further increases the mixing of the catalyzed exhaust and the exhaust reductant 218 (the mixture of the catalyzed exhaust F1, F2, F4 and the exhaust reductant 218 being indicated with dashed line F3'). More particularly, the additional branch conduit 206B2 similarly extends between an inlet end B2_in and an outlet end B2_out, where the inlet end B2_in is positioned at a third location along the main portion 206M of the mixing conduit 206 in the bulk flow direction L1 and the outlet end B2_out is positioned at a fourth location along the main portion 206M of the mixing conduit 206 in the bulk flow direction L1. The inlet end B2_in of the branch conduit 206B2 is located at a position upstream of the outlet end B2_out of the branch conduit 206B2 relative to the bulk flow direction L1.

In some embodiments, the branch conduits 206B, 206B2 are staggered along the bulk flow direction L1. For instance, in one embodiment, as shown in FIG. 3D, inlet end B2_in of the additional branch conduit 206B2 is downstream of the inlet end B_in of the branch conduit 206B along the bulk flow direction L1. Similarly, in one embodiment, the outlet end B2_out of the additional branch conduit 206B2 is downstream of the outlet end B_out of the branch conduit 206B along the bulk flow direction L1. Additionally, in some embodiments, the outlet end B_out of the branch conduit 206B may be downstream of the inlet end B2_in of the additional branch conduit 206B2 along the bulk flow direction L1. Alternatively, in other embodiments, the outlet end B_out of the branch conduit 206B may be upstream of the inlet end B2_in of the additional branch conduit 206B2 along the bulk flow direction L1. However, in other embodiments, inlet ends B_in, B2_in of the branch conduits 206B, 206B2 may be aligned along the bulk flow direction L1 and/or the outlet ends B_out, B2_out of the branch conduits 206B, 206B2 may be aligned along the bulk flow direction L1.

The additional branch conduit 206B2 is similarly configured such that the outlet end B2_out is configured to direct the portion of the catalyzed exhaust F4 to re-enter the main portion 206M of the mixing conduit 206 in a way that induces a spiraling flow within the main portion 206M of the mixing conduit 206 downstream of the outlet end B_out of the branch conduit 206B. In several embodiments, the outlet end B2-out of the additional branch conduit 206B2 is oriented relative to the main portion 206M of the mixing conduit 206 such that the swirling or spiraling flow is induced within the mixing conduit 206. For instance, as particularly shown in FIG. 4B, at least a portion of the outlet end B2_out of the additional branch conduit 206B2 is oriented tangent or substantially tangent to the outer circumference of the main portion 206M of the mixing conduit 206 in a plane perpendicular to the bulk flow direction L1 such that the catalyzed exhaust F4 exiting the outlet end B2_out of the additional branch conduit 206B2 flows along the inner circumference of the main portion 206M of the mixing conduit 206 in the circumferential direction C1 and contributes to the spiraling flow of the mixture F3' within the mixing conduit 206 downstream of the outlet end B2_out of the additional branch conduit 206B2.

Additionally, in some embodiments, the inlet end B2_in of the additional branch conduit 206B2 may be at a different position from the outlet end B2_out of the additional branch conduit 206B2 about the outer circumference of the main portion 206M of the mixing conduit 206 in the circumferential direction C1. As such, the additional branch conduit 206B2 may also at least partially wrap in the same circumferential direction C1 about the main portion 206M of the mixing conduit 206 from the inlet end B2_in to the outlet end B2_out. Such wrapping helps to further induce the spiraling flow of the portion of the catalyzed exhaust F4 exiting the additional branch conduit 206B2 when the outlet end B2_out is oriented tangent or substantially tangent to the main portion 206M of the mixing conduit 206, or helps to independently induce spiraling flow of the portion of the catalyzed exhaust F4 when the outlet end B2_out is not oriented tangent or substantially tangent to the main portion 206M of the mixing conduit 206. However, it should be appreciated that, in some embodiments, the inlet and outlet ends B2_in, B2_out of the additional branch conduit 206B2 may be at the same position about the outer circumference of the main portion 206M of the mixing conduit 206 in the circumferential direction C1, such that the inlet and outlet ends B2_in, B2_out of the additional branch conduit 206B2 are aligned along the bulk flow direction L1, with at least the outlet end B2_out of the branch conduit 206B being oriented tangent or substantially tangent to the main portion 206M of the mixing conduit 206.

In one embodiment, such as the embodiment illustrated in FIG. 4B, the inlet ends B_in, B2_in of the different branch conduits 206B, 206B2 may be at a different positions about the outer circumference of the mixing conduit 206 in the circumferential direction C1 and the outlet ends B_out, B2_out of the different branch conduits 206B, 206B2 may be at different positions about the outer circumference of the mixing conduit 206 in the circumferential direction C1. However, in one embodiment, the branch conduits 206B, 206B2 preferably wrap in the same circumferential direction C1 about the main portion 206M such that exhaust F2, F4 from the branch conduits 206B, 206B2 induce spiraling flow in the same circumferential direction C1. It should additionally be appreciated that, in other embodiments, the inlets B_in, B2_in and/or the outlets B_out, B2_out of the branch conduits 206B, 206B2 may be at the same circumferential positions about the main portion 206M of the mixing conduit 206, while being spaced apart along the bulk flow direction L1.

As shown in FIGS. 3A-4B, an average diameter of the branch conduit 206B is generally smaller than an average diameter of the main portion 206M of the mixing conduit 206 such that the velocity of the mixture F3 along the bulk flow direction L1 is not significantly reduced compared to the velocity of the exhaust F1 along the bulk flow direction L1, which helps to prevent back pressure and maintain efficiency of the exhaust treatment system 200. In some embodiments, such as in FIG. 3E, the inner diameter of the main portion 206M of the mixing conduit 206 may be reduced between the inlet and outlet ends B_in, B_out of the branch conduit 206B to increase the velocity of the exhaust F1 through the main portion 206M. For instance, as shown in FIG. 3E, an inner diameter D1 of the main portion 206M of the mixing conduit 206 proximate the upstream end 214 is larger than an inner diameter D2 of the main portion 206M of the mixing conduit 206 between the inlet and outlet ends B_in, B_out of the branch conduit 206B. In one embodiment, this area of reduced diameter may be configured to create a venturi effect or portion within the main portion 206M of the mixing conduit 206.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An exhaust treatment system for a work vehicle, the system comprising:
    a mixing conduit extending between an upstream end and a downstream end along a bulk flow direction, the upstream end of the mixing conduit being configured to receive engine exhaust;
    an injector nozzle configured to inject exhaust reductant into the mixing conduit at a location between the upstream and downstream ends of the mixing conduit;
    a first branch conduit extending between an inlet end and an outlet end, the inlet end of the first branch conduit being fluidly coupled to the mixing conduit upstream relative to the bulk flow direction of a location at which the outlet end of the first branch conduit is fluidly coupled to the mixing conduit, a portion of the engine exhaust flowing through the mixing conduit being directed through the first branch conduit, the outlet end of the first branch conduit being configured to direct the portion of the engine exhaust back into the mixing conduit such that a spiraling flow of the engine exhaust is generated within the mixing conduit; and
    a second branch conduit extending between a second inlet end and a second outlet end, the second inlet end of the second branch conduit being fluidly coupled to the mixing conduit upstream relative to the bulk flow direction of a location at which the second outlet end of the second branch conduit is fluidly coupled to the mixing conduit, a second portion of the engine exhaust flowing through the mixing conduit being directed through the second branch conduit, the second outlet end of the second branch conduit being configured to direct the second portion of the engine exhaust back into the mixing conduit to contribute to the spiraling flow of the engine exhaust within the mixing conduit.

2. The system of claim 1, wherein the inlet end of the first branch conduit is upstream of an outlet opening of the injector nozzle relative to the bulk flow direction.

3. The system of claim 1, wherein the outlet end of the first branch conduit is upstream of an outlet opening of the injector nozzle relative to the bulk flow direction.

4. The system of claim 1, wherein the second outlet end of the second branch conduit is downstream of an outlet opening of the injector nozzle relative to the bulk flow direction.

5. The system of claim 1, wherein a spray axis of the injector nozzle is parallel to the bulk flow direction.

6. The system of claim 1, wherein a diameter of the first branch conduit at the inlet end is larger than a diameter of the first branch conduit at the outlet end.

7. The system of claim 1, wherein a diameter of the mixing conduit between the inlet and outlet ends of the first branch conduit is smaller than a diameter of the mixing conduit upstream of the inlet end of the first branch conduit relative to the bulk flow direction.

8. The system of claim 1, wherein at least a portion of the outlet end of the first branch conduit is oriented tangent to the mixing conduit in a plane perpendicular to the bulk flow direction.

9. The system of claim 1, wherein the first branch conduit wraps from the inlet end to the outlet end in a circumferential direction about the mixing conduit.

10. The system of claim 9, wherein the inlet end of the first branch conduit is at a different circumferential position about the mixing conduit than the outlet end of the first branch conduit.

11. The system of claim 1, wherein the second outlet end of the second branch conduit is downstream of the outlet end of the first branch conduit relative to the bulk flow direction.

12. The system of claim 1, wherein at least a portion of the second outlet end of the second branch conduit is oriented tangent to the mixing conduit in a plane perpendicular to the bulk flow direction.

13. The system of claim 1, wherein the second branch conduit wraps from the second inlet end to the second outlet end in a circumferential direction about the mixing conduit.

14. A work vehicle, comprising:
an engine; and
an exhaust treatment system configured to receive engine exhaust from the engine, the exhaust treatment system comprising:
a mixing conduit extending between an upstream end and a downstream end along a bulk flow direction, the upstream end of the mixing conduit being configured to receive engine exhaust;
an injector nozzle configured to inject exhaust reductant into the mixing conduit at a location between the upstream and downstream ends of the mixing conduit;
a first branch conduit extending between an inlet end and an outlet end, the inlet end of the first branch conduit being fluidly coupled to the mixing conduit upstream relative to the bulk flow direction of a location at which the outlet end of the first branch conduit is fluidly coupled to the mixing conduit, a portion of the engine exhaust flowing through the mixing conduit being directed through the first branch conduit, the outlet end of the first branch conduit being configured to direct the portion of the engine exhaust back into the mixing conduit such that a spiraling flow of the engine exhaust is generated within the mixing conduit; and
a second branch conduit extending between a second inlet end and a second outlet end, the second inlet end of the second branch conduit being fluidly coupled to the mixing conduit upstream relative to the bulk flow direction of a location at which the second outlet end of the second branch conduit is fluidly coupled to the mixing conduit, a second portion of the engine exhaust flowing through the mixing conduit being directed through the second branch conduit, the second outlet end of the second branch conduit being configured to direct the second portion of the engine exhaust back into the mixing conduit to contribute to the spiraling flow of the engine exhaust within the mixing conduit.

15. The work vehicle of claim 14, wherein at least a portion of the outlet end of the first branch conduit is oriented tangent to the mixing conduit in a plane perpendicular to the bulk flow direction.

16. The work vehicle of claim 14, wherein a diameter of the first branch conduit at the inlet end is larger than a diameter of the first branch conduit at the outlet end.

17. The work vehicle of claim 14, wherein a diameter of the mixing conduit between the inlet and outlet ends of the first branch conduit is smaller than a diameter of the mixing conduit upstream of the inlet end of the first branch conduit relative to the bulk flow direction.

18. The work vehicle of claim 14, wherein the inlet end of the first branch conduit is at a different circumferential position about the mixing conduit than the outlet end of the first branch conduit.

19. An exhaust treatment system for a work vehicle, the system comprising:
a mixing conduit extending between an upstream end and a downstream end along a bulk flow direction, the upstream end of the mixing conduit being configured to receive engine exhaust;
an injector nozzle configured to inject exhaust reductant into the mixing conduit at a location between the upstream and downstream ends of the mixing conduit, a spray axis of the injector nozzle being parallel to the bulk flow direction; and
a branch conduit extending between an inlet end and an outlet end, the inlet end of the branch conduit being fluidly coupled to the mixing conduit upstream relative to the bulk flow direction of a location at which the outlet end of the branch conduit is fluidly coupled to the mixing conduit, a portion of the engine exhaust flowing through the mixing conduit being directed through the branch conduit, at least a portion of the outlet end of the branch conduit being oriented tangent to the mixing conduit in a plane perpendicular to the bulk flow direction such that the outlet end of the branch conduit is configured to direct the portion of the engine exhaust back into the mixing conduit such that a spiraling flow of the engine exhaust is generated within the mixing conduit.

20. The system of claim 19, further comprising a selective catalytic reduction (SCR) system configured to react a mixture of the exhaust reductant and the engine exhaust received from the downstream end of the mixing conduit with a catalyst to generate a treated exhaust flow,
wherein a diameter of the mixing conduit between the inlet and outlet ends of the branch conduit is smaller than a diameter of the mixing conduit upstream of the inlet end of the branch conduit relative to the bulk flow direction.

* * * * *